United States Patent
Krummel

(10) Patent No.: US 9,279,655 B2
(45) Date of Patent: Mar. 8, 2016

(54) NON-CONTACT ELECTRICAL MACHINE AIR GAP MEASUREMENT TOOL

(71) Applicant: Trent J. Krummel, Eliot, ME (US)

(72) Inventor: Trent J. Krummel, Eliot, ME (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 216 days.

(21) Appl. No.: 13/777,399

(22) Filed: Feb. 26, 2013

(65) Prior Publication Data
US 2014/0239974 A1  Aug. 28, 2014

(51) Int. Cl.
*G01B 3/00* (2006.01)
*G01B 7/14* (2006.01)

(52) U.S. Cl.
CPC ........................................ *G01B 7/14* (2013.01)

(58) Field of Classification Search
CPC .......... G01B 7/14; G01B 7/023; G06F 3/044; G06F 3/0416; G06F 2203/04111; G01R 27/2605; G01R 31/2605; H03K 2217/96066; H03K 17/962
See application file for complete search history.

(56) References Cited

U.S. PATENT DOCUMENTS

| | | | |
|---|---|---|---|
| 4,675,670 A * | 6/1987 | Lalonde et al. | 340/870.37 |
| 5,231,374 A * | 7/1993 | Larsen et al. | 340/540 |
| 6,075,464 A | 6/2000 | Cloutier et al. | |
| 6,552,667 B1 * | 4/2003 | Missout et al. | 340/870.37 |
| 6,593,734 B1 * | 7/2003 | Gandel et al. | 324/207.25 |
| 7,671,607 B2 * | 3/2010 | Hayek et al. | 324/690 |
| 7,999,535 B2 | 8/2011 | Dietz et al. | |
| 2007/0005294 A1 * | 1/2007 | Andarawis et al. | 702/155 |

\* cited by examiner

*Primary Examiner* — Alesa Allgood

(57) ABSTRACT

A measuring kit for contactless measuring of the air gap distance between a frame mounted pole and core of a rotor includes a capacitance sensor which generates a signal proportional to the measured air gap, a panel meter in communication with the capacitance sensor which interprets the signal and displays the minimum air gap distance, an A/D converter also in communication with the capacitance sensor which converts the signal to a digitized signal, and a control panel which takes the digitized signal from the A/D converter, processes the digitized signal, and then displays the minimum air gap measurement. The control panel shows a graphic of the core and its surrounding poles to track the progress of the testing, and when the testing between the core and one of the surrounding poles is complete, the graphic of the pole tested visually darkens to indicate that portion of the test is complete.

3 Claims, 5 Drawing Sheets

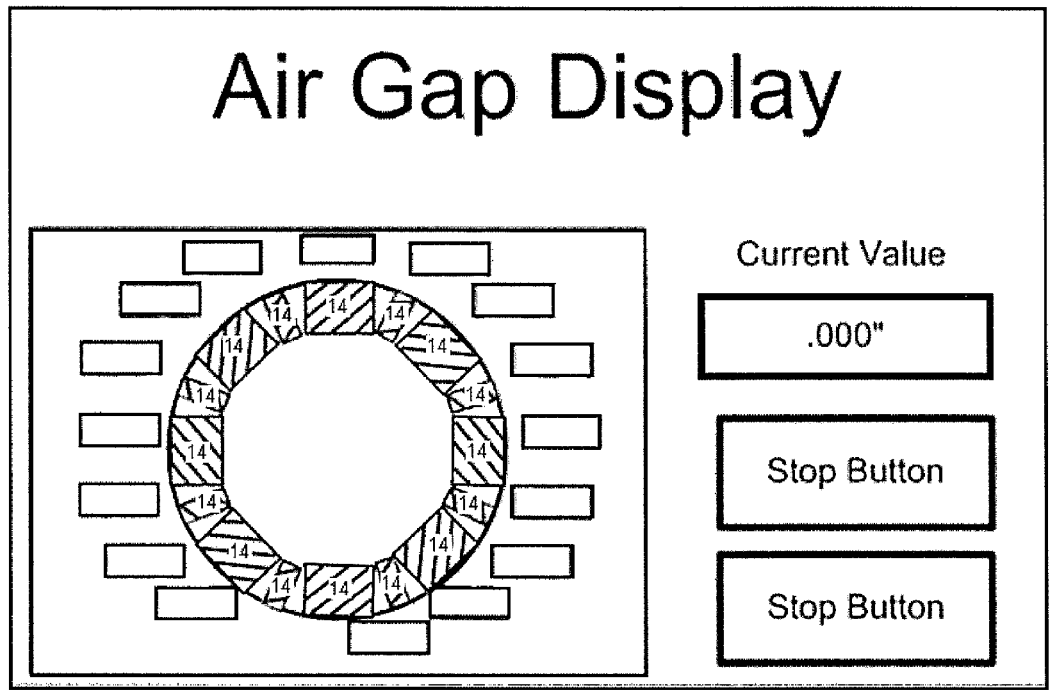
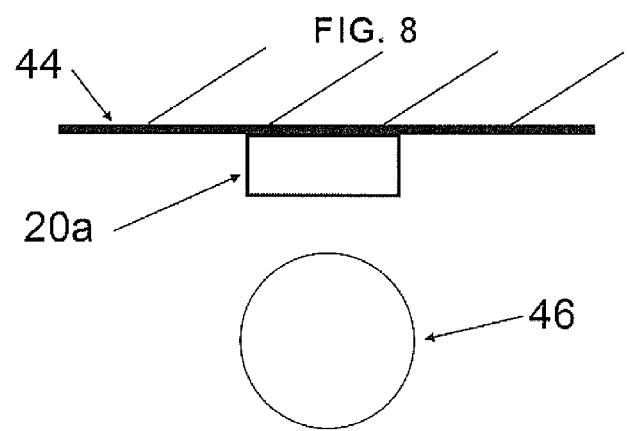
FIG. 9

NON-CONTACT ELECTRICAL MACHINE AIR GAP MEASUREMENT TOOL

STATEMENT OF GOVERNMENT INTEREST

The invention described herein was made in the performance of official duties by one or more employees of the Department of the Navy, and thus, the invention herein may be manufactured, used or licensed by or for the Government of the United States of America for governmental purposes without the payment of any royalties thereon or therefor.

FIELD OF THE INVENTION

The disclosure relates generally to a non-contact method and tool for measuring the air gap distance between frame mounted poles and the core of a rotating armature in electrical machinery.

BACKGROUND OF THE INVENTION

Air gaps in electrical machinery are required to be maintained within certain dimensional tolerances for proper operation. The tolerances are checked each time a rotor is changed, or when troubleshooting or testing. If the measured air gap is not within the required dimensional tolerance, then the air gap is adjusted to be within that range. Adjustment of the air gap to within the required dimensional tolerance helps improve commutation, regulation, physical clearance, among other machine parameters.

Contact methods such as a wedged feeler gauge type method have traditionally been used to measure air gaps. According to this method, a tapered bar or "wedge" (shown in FIG. 1 as 18) is coated with graphite and then slid between the core and the pole until resistance is felt. The wedge is then removed, and the point where the core and the pole scrape the graphite is measured. There are several problems with this method. The wedged feeler gauge type method is time consuming, cumbersome, and inconsistent. The method is prone to human error due to the varying amounts of force a person can use to push the wedge in. Obviously, pushing the wedge 18 in more or less yields a different air gap measurement. The measurement difference is significant especially since the air gap distance is small and the measurements are taken in micrometers. Additional variances in the measurement can result from the position on the rotor from which measurements are taken. The position on the rotor from which measurements are taken must be located under the exact center of the pole for an accurate minimum reading. Centering can be difficult in areas with limited visibility, and the pole's center must be aligned with a mirror. The method is also problematic because this method often requires the removal of internal bus work to get enough physical access to take the measurements. Unnecessary disassembly adds additional time and risk during reassembly.

SUMMARY OF THE INVENTION

In one embodiment, a portable test kit for measuring an air gap between a core and a pole of a rotor includes a capacitance sensor which measures a minimum air gap between the capacitance sensor and a pole and which generates a voltage signal proportional to the measured air gap, a panel meter in communication with the capacitance sensor which interprets the voltage signal and displays the minimum air gap measurement between the core and the pole, an A/D converter in communication with the capacitance sensor which converts the voltage signal to a digitized signal, and a control panel which receives the digitized signal from the A/D converter and processes the digitized signal. The control panel collects and displays the minimum air gap measurement, and displays a graphic of the core and surrounding poles. When testing between the core and one of the surrounding poles is complete, the graphic of the pole tested visually darkens to indicate that portion of the test is complete. A case designed for portability contains the capacitance sensor, the panel meter, the A/D converter and the control panel.

In another embodiment, a non-contact test method for measuring an air gap between a rotor core and a stationary pole which includes the steps of affixing a capacitance sensor to a core of a rotor. The capacitance sensor is arranged between the core and the stationary pole, capturing the air gap measurement between the core and the pole with the capacitance sensor, and displaying the air gap measurement.

In yet another embodiment, a non-contact test method for measuring an air gap between a rotating element and a stationary element, includes affixing a capacitance sensor to a rotating element, the capacitance sensor being arranged between the rotating element and a stationary element, capturing an air gap measurement between the rotating element and the stationary element with the capacitance sensor, and displaying the air gap measurement.

In still another embodiment, a non-contact test method for measuring an air gap between a rotating surface and a stationary element includes affixing a capacitance sensor to a stationary element, the capacitance sensor being arranged between the rotating surface and the stationary element, capturing an air gap measurement between the rotating surface and the stationary element with the capacitance sensor, and displaying the air gap measurement.

BRIEF DESCRIPTION OF THE DRAWINGS

FIG. 8 illustrates an enlarged view of the control panel shown in FIG. 4; and

FIG. 9 illustrates a portion of a sensor attached to a fixed location opposite a rotating surface.

DETAILED DESCRIPTION

Figure 1:
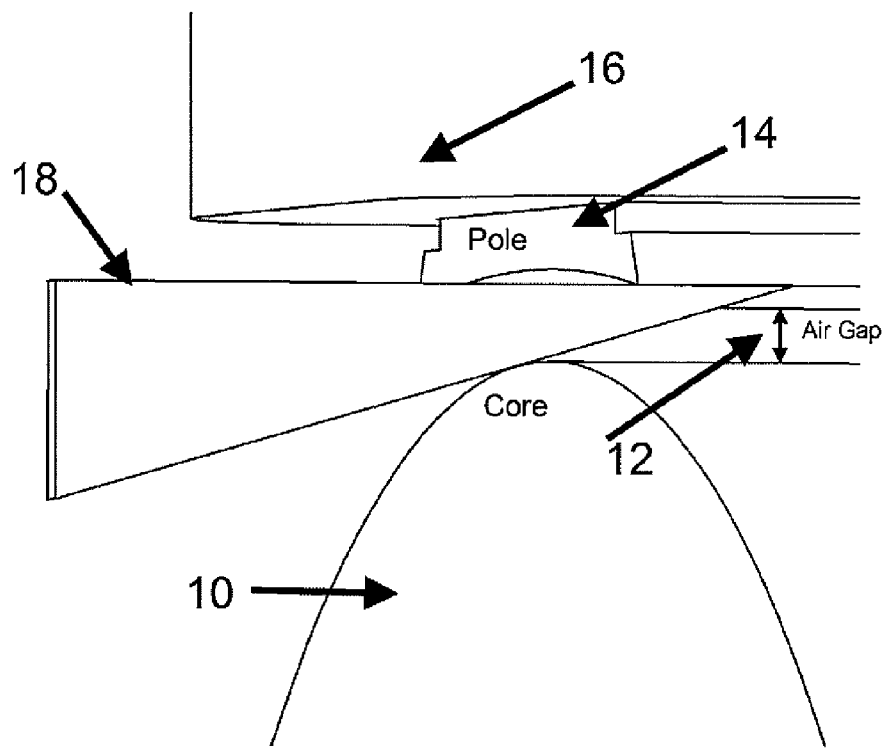
FIG. 1 illustrates a portion of a rotor core and a pole and shows a wedged feeler gauge.

A non-contact electrical machine air gap test kit for measuring the air gap distance between a stationary element such as frame mounted poles and a rotating element such as the core of a rotating armature in electrical machinery includes a case containing a capacitance sensor, a panel meter, an A/D converter and a control panel. All of the components of the test kit including the sensor, the panel meter, the A/D converter and the control panel or panel PC are integrated together into a custom panel and case that is ideally configured for portability, such with a handle 36 (shown in FIG. 4) or a size or a shape conducive to portability. The air gap being measured is the distance between the core of the rotating armature and the frame mounted pole. As shown in FIG. 1, the air gap 12 is defined between a core 10 of a rotor and a pole 14 mounted to a frame 16.

Figure 2:
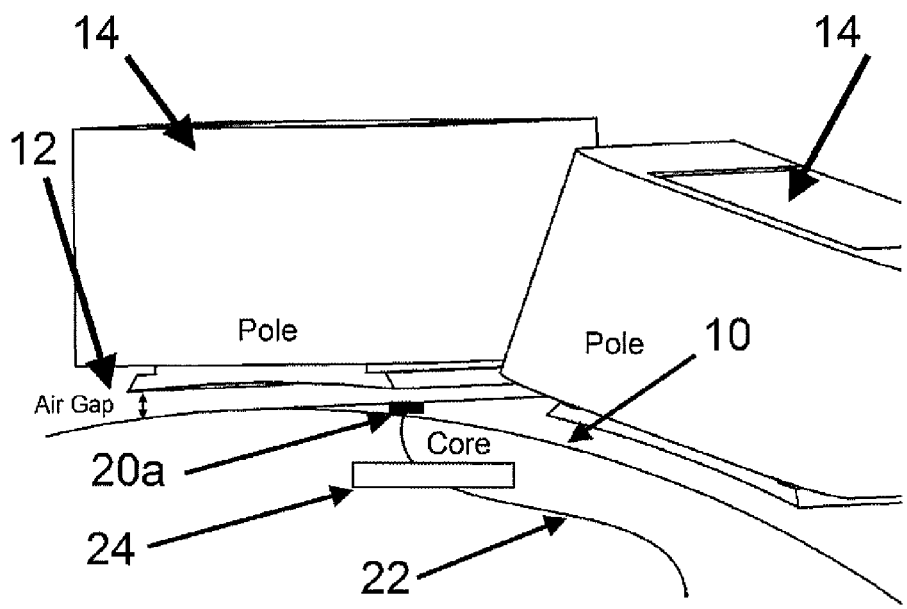
FIG. 2 illustrates a portion of a rotor core and a pole and shows the placement of the sensor.
Figure 3:
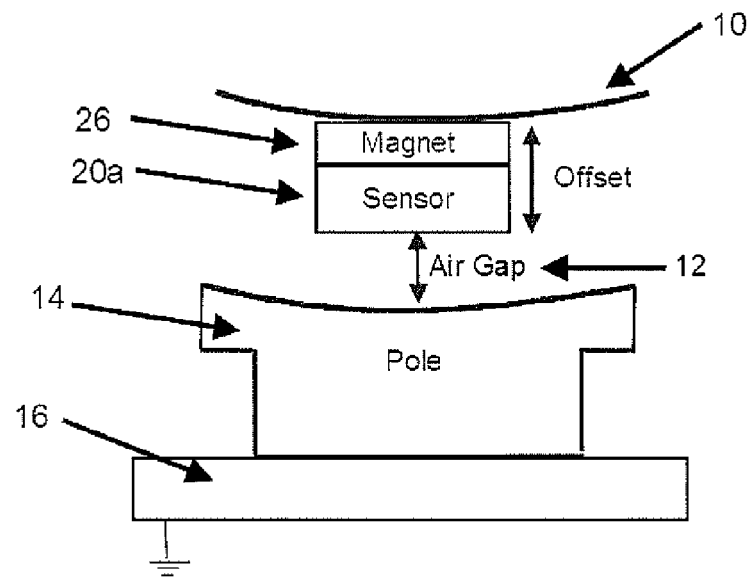
FIG. 3 illustrates the sensor offset.

In the embodiment shown in FIG. 2, capacitance probe 20a is in communication with wire 22. The probe 20a is secured to the core 10 and arranged to face the pole 14 or other target being measured. The probe 20a creates a capacitor between itself and the object being measured (pole 14). The controller 20b (shown in FIG. 7) measures this capacitance. In the foreground of FIG. 2, a piece of tape 24 is shown. Tape 24 is used to provide strain relief and prevent rotational motion from pulling the sensor/magnet combination off of the core 10 of the rotor. The capacitance probe 20a is positioned between the core 10 and the pole 14 within the air gap 12 defined between the core 10 and the pole 14. The capacitance probe 20a is a modified commercial off the shelf ("COTS") capacitive sensor and removably attaches to the core 10 of the rotor beneath the stationary poles 14. In the embodiment of FIG. 3, the capacitance probe 20a is modified to include a magnet 26 and an external reference lead 24. The magnet 26 is used as a means for attaching the probe 20a to the core 10. The magnet 26 is preferably a neodymium magnet. The magnet 26 is but one example of an adhesion device to attach the capacitance probe 20a to the core 10. However, any suitable means for attaching the capacitance probe 20a to the core 10 is acceptable and materials other than neodymium may be found suitable.

The capacitance probe 20a is connected to the COTS controller 20b (shown in FIG. 7) a fixture that is already referenced to ground. The controller 20b outputs 0-10 VDC proportional to 0 (inches) to Full Scale (inches) of the probe, which in the example embodiment being discussed would be 0.00"-0.200", which is the distance from the face of the probe 20a (which is at 0") to the pole 14. The unit of measure in this example is inches, but it could also be another unit of measure such as micrometers. Together, the probe 20a and the controller 20b comprise the capacitance sensor 20.

The sensor 20 is configured to measure a minimum air gap between the capacitance probe 20a and pole 14, and configured to generate a voltage signal proportional to the measured air gap 12. The measurement read by the probe 20a is a measurement reflective of the distance from the face of the probe 20a to the pole 14 but not the desired reading from the core 10 to the pole 14. To account for this, the measurement needs to corrected by the amount of an offset. The offset, shown in the embodiment of FIG. 3, is comprised of the thickness of the probe 20a plus the thickness of the magnet 26.

Figure 4:
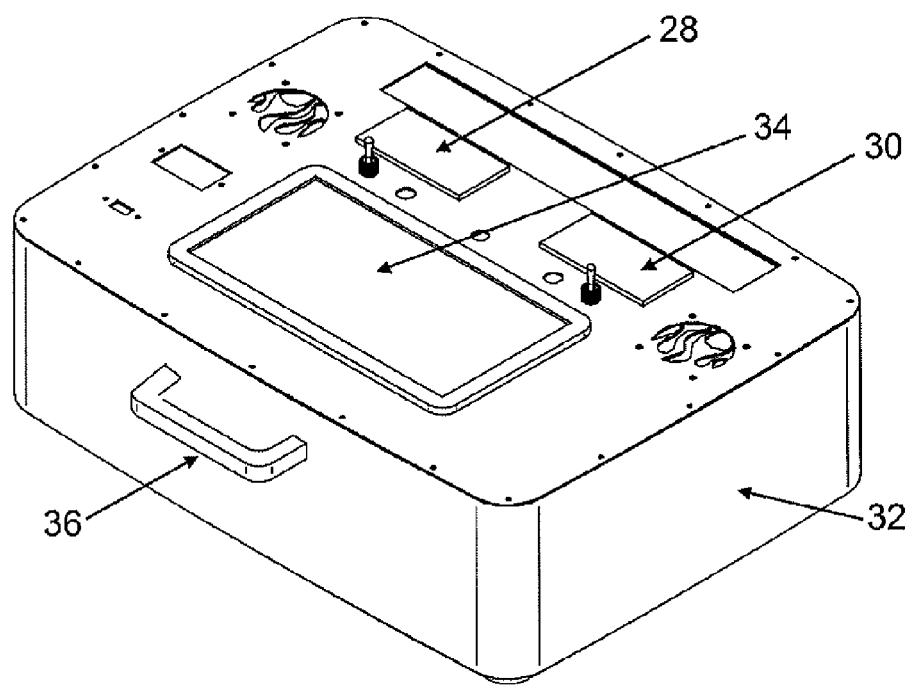
FIG. 4 illustrates an embodiment of the test kit and shows the control panel.

The voltage signal output of the sensor 20 is interpreted and processed by panel meters 28, 30, shown in FIG. 4, and also by an analog to digital ("A/D") converter 42. The A/D converter is not seen in FIG. 4, but is located internal to the panel PC 34 shown in FIG. 7. The panel meters 28, 30 are in communication with the capacitance sensor 20 and configured to interpret the voltage signal. Panel meters 28, 30 display the minimum air gap for the particular pole 14 under test. An internal feature of the meters 28, 30 is that they are configurable to display and hold the minimum air gap reading between the core and the pole. It is important to note that as the probe is rotated beneath a pole, the values measured go from maximum to minimum back to maximum. The minimum value is the value of interest. The minimum air gap measurement occurs when the sensor is rotated under the center of the pole 14. The two panel meters 28 and 30 are redundant. Generally the air gap readings are done one at a time, however, with two panel meters 28, 30, the assembly contains two channels. The spare channel provides a redundant channel in the case of channel failure. The second channel also provides the capability to measure both sides of the air gap 12 at the same time. An air gap measurement at each end of the pole 14 checks parallelism of the pole face to the rotor core 10.

The sensor 20 is also in communication with the A/D converter which is in further communication with the control panel or panel PC 34. On the face of the control panel 34 is displayed a graphic of the core and its surrounding poles. The face of the control panel or panel PC 34 is a touchscreen. An enlarged view of the face of the control panel is shown in FIG. 8. The control panel 34 is adapted to receive a digitized signal from the A/D converter and process the signal, and configured to collect and display the minimum air gap measurement.

Figure 5:
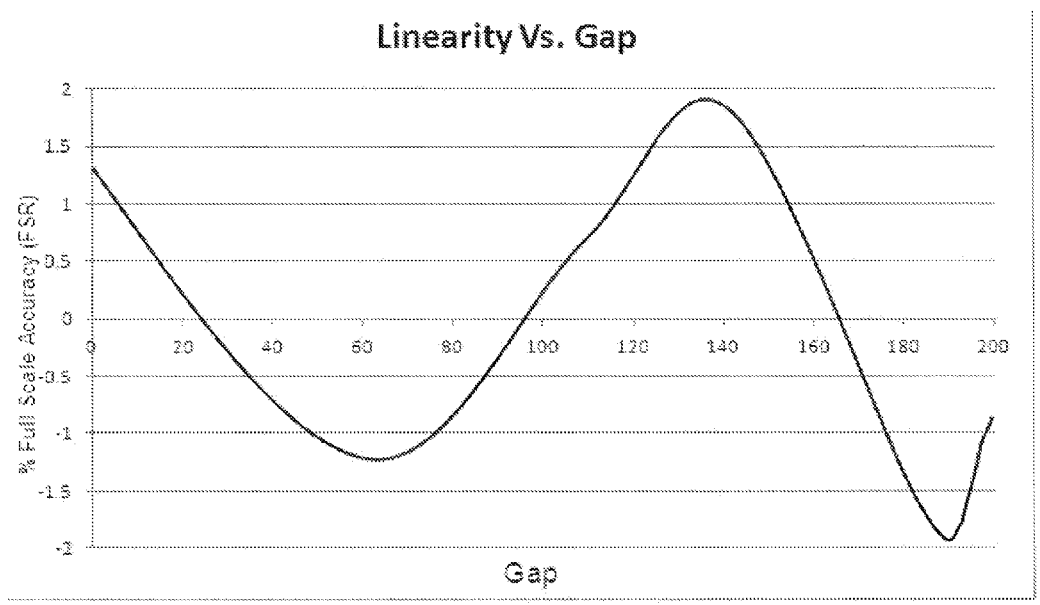
FIG. 5 illustrates a calibration graph.

The COTS capacitive sensor has a known linear accuracy. In a known capacitive sensor, the MTI Accumeasure 9000, the linear accuracy is +/−0.003 inches. Ideally, the accuracy of the device for this application should be closer to +/−0.001 inches. The capacitive sensor comes with a calibration report. An example of a calibration report is shown in FIG. 5. The report shows the percent full scale accuracy on the y-axis versus the gap being read, on the x-axis. The sensor inaccuracy is a known constant. In order to improve the accuracy of the sensor, the calibration report is used to create a linearizing correction curve. This is done by breaking down the curve in the calibration report into ten linear segments and creating a piece wise linear scale for each of the ten segments. Both the automatic and manual modes of the tool both use this piece wise scale method to correct for the know inaccuracy of the sensor.

Figure 6:
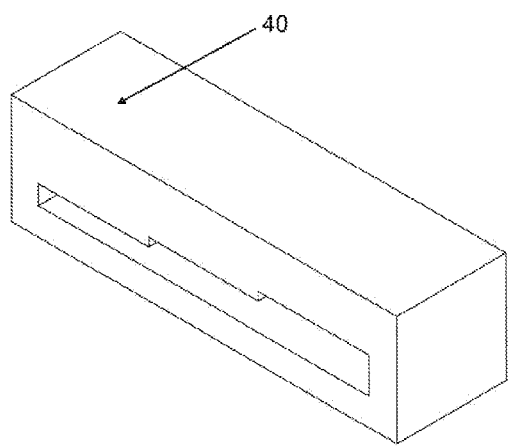
FIG. 6 illustrates a perspective view of a calibration block.

With the help of a calibration block 40, shown in FIG. 6, system accuracy is verified prior to each measurement being taken. The sensor is placed within three gaps of a known dimension that are incorporated on the face of the custom control panel, i.e., calibration block 40. The gaps have three known steps spanning from the minimum dimension of the offset, which in the exemplary embodiment is approximately 0.135 inches, to a maximum dimension of the Full Scale of the probe range, which in the exemplary embodiment is approximately 0.335 inches. Using the piece wise correction method discussed above, the device measures within +/−0.001 inches; this is the acceptable tolerance for this measurement system and by verifying it prior to taking each measurement, the operator is assured that the system is operating properly.

There are two operating modes, manual and automatic. The collected data is displayed through either the manual or automatic mode. The two modes may be operated at the same time or independently. The standard operating mode is considered to be the automatic collection mode. In either operation mode, the processing is common to both. The minimum distance value between the rotor 10 and the pole 14 is considered the "air gap" and this is the distance displayed.

The manual mode makes use of the panel meters 28, 30 shown in FIG. 4. The panel meters 28, 30 yield a redundant display of the air gap measurements in real time. Redundant meters and modes allow for device operation in the case of a automatic mode failure. In the manual mode, the capacitance probe 20a which is secured to the core 10 is manually rotated under each pole 14 being tested to measure the air gap between the capacitance probe 20a and the pole 14, and the lowest minimum air gap reading is displayed on the meters 28, 30. Each pole has its own minimum reading and the process must be repeated for each pole. The meter is then reset manually and the process repeated for each of the 16 poles 14 that are arranged about the core 10 in a 360° circle.

The automatic mode works in parallel with the meters 28, 30. The automatic mode operates with custom software built into the control panel or panel PC 34 and allows for automatic readings of all 16 air gaps through a 360° rotation. In the automatic mode, the capacitance probe 20a secured to the core 10 is slowly advanced through a full 360 degree rotation so that each of the 16 poles that surround the core may be tested. As the capacitance probe 20a is advanced, the custom software collects the minimum air gap reading for each pole. The control panel 34 collects and displays the minimum air gap measurement collected from a set of measurements taken. Preferably three measurements are taken at each station, and then from that grouping of measurements, the minimum air gap measurement is determined and selected to be displayed on the control panel 34 by the custom software. On the face of the control panel 34 is displayed a graphic of the core 10 and its surrounding poles 14, as shown in FIG. 8. When a test between the core 10 and a pole 14 is complete, the graphic of the pole 14 tested visually darkens to indicate that the pole 14 has been tested and that portion of the test is complete. Because the sensor 20 measures a probe-to-target distance, an offset equal to the thickness of the probe plus the thickness of the magnet is added to the reading from the capacitive probe to determine the core 10 to pole (target) 14 distance. In the exemplary embodiment, an offset of 0.135 inches would be added to the 0.000"-0.200" reading from the capacitive probe to determine the core 10 to pole 14 distance, 0.135" being the thickness of the capacitive probe.

Figure 7:
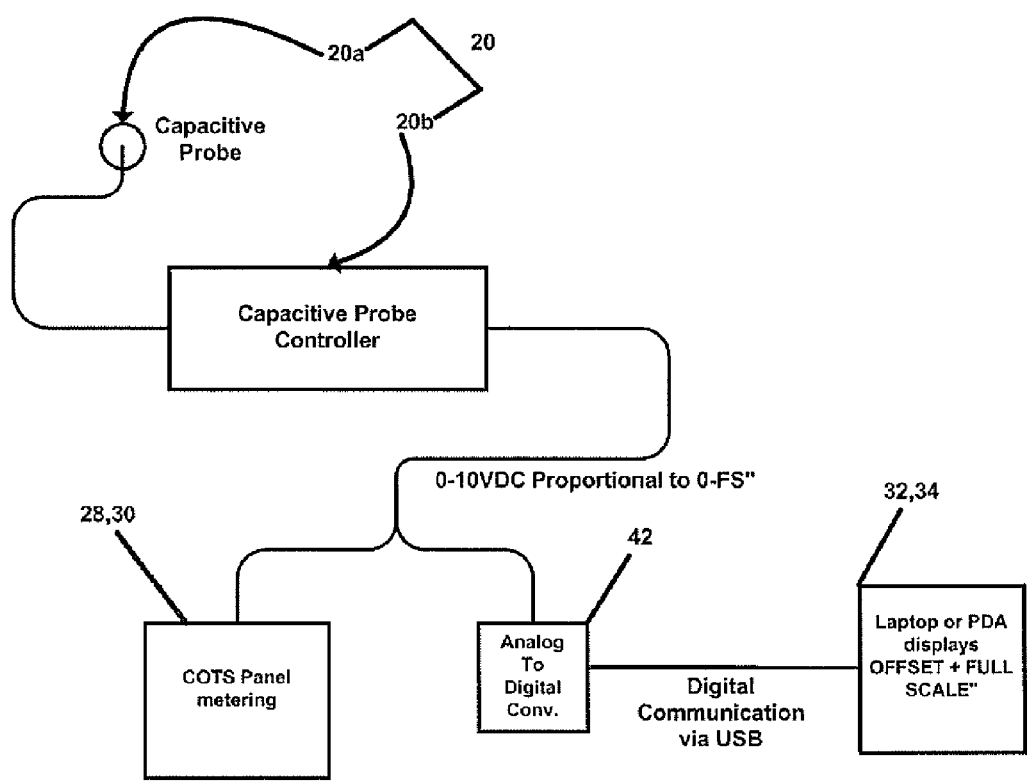
FIG. 7 illustrates a signal layout for the test kit.

The air gap test equipment signal layout is shown in FIG. 7. In operation, the capacitance probe 20a, which is the PCR-50 probe for example, senses the air gap, and sends an electrical signal, in this instance a 16 kHz signal to the controller 20b. The controller 20b is the MTI Accumeasure 9000, for example. The sensor 20 sends an output 0-10 VDC which is read by the A/D converter and by the panel meters 28, 30. The sensor 20 outputs a voltage >10 VDC when the pole is out of range. The >10 VDC correlates to >Full Scale inches, which indicates the target or pole is out of range. In the exemplary embodiment, the output voltage of >10 VDS correlates to >0.335 inches. The A/D converter may for example be the USP-6008 produced by National Instruments. The sensor output of the sensor 20 is a linear voltage proportional to the air gap. The A/D converter sends the sensor 20 output in a digital format or digitized form to the custom software onboard the control panel 34 that processes the data and produces the air gap measurement.

The custom software may be written for example with the Lab VIEW compiler. The program works to allow for automatic readings of all 16 air gaps through a 360° rotation. The program corrects to the calibration curve, maintains each pole's profile and logs the minimum reading, accomplished through three major execution steps: 1) a data surveying "while loop"; 2) a data collection "while loop"; and 3) an indicating "for loop." A status flag is used to control process flow. A false status flag keeps the program in the data surveying loop. The data surveying loop can change the flag value from false to true. A true flag transfers the program to the data collection loop. At completion of the data collection, the false status flag is reset to true.

The data surveying loop is the loop that initializes on program startup and initiates program flow. It is the overall while loop and is controlled by a "stop" button on the graphical user interface ("GUI"). Each iteration of the loop collects a distance value from the A/D converter. The expected values are from 0-Full Scale, which in the example embodiment is 0.135"-0.335". If the measured value is greater than Full Scale or in this example embodiment greater than 0.333", it is assumed that the sensor is in-between two poles rather than under a pole, and it checks for the distance value again. Data values greater than Full Scale is not processed and the status flag remains false. If the first value measured is less than Full Scale, it is assumed that the sensor has been rotated beneath a pole. The data surveying loop in this case changes the status flag to true thereby enabling the data collection loop.

The data collection loop is nested internal to the data surveying "while loop" in the custom program. The status flag initiates the data collection loop and interrupts the data surveying loop. The data surveying loop is a while loop based on the current value. The expected values in this loop are less than Full Scale. If the values are less than Full Scale, the data collection loop stays locked in. The current value is added to an auto indexing array. This array continues to build as long as the current value is less than Full Scale. If the first value is greater than Full Scale then the data collection loop stops and the array is complete. This would happen as the sensor 20a is rotated past the pole being tested and is between two poles, just before coming beneath the next pole to be tested. The array with the collected is then processed to determine the lowest value. The lowest value is then sent to the indicating for loop.

The indicating for loop is internal to the data surveying loop of the custom program and operates once when the status flag has been set and after the data collection loop is complete. It displays the processed lowest value in the appropriate indication on the graphical user interface or GUI. The initial display index is zero. The first time the status flag is set the lowest value is displayed at indicator "zero". The status flag is reset to false and the display index is incremented by one. Once the value is displayed the data surveying loop continues. The next time the for loop is called, the air gap measurement will be displayed in indicator "one". The correlation between display index and the actual pole being read relies on the user. For example index zero is always the first pole measured, followed by the second pole measured. The custom program assumes the sensor 20a is started in a particular location and rotated in one direction. In this manner, all 16 pole measurements are successively displayed without interruption. Measurement of the entire machine takes less than five minutes. Post correction of the data, all readings are accurate within 0.002". At the completion of the measurements a screen shot is logged for future access, as shown in FIG. 8.

The uses of this kit are not limited to air gap testing but may include other electrical motor diagnostic features. As shown in FIG. 9, one such embodiment would include mounting the sensor 20a to a fixed location 44 and rotating a surface 46 beneath. The A/D converter combined with the panel PC could monitor dynamic run out of surfaces such as slip rings while a machine is operational.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A non-contact test method for measuring an air gap between a rotating surface and a stationary element, comprising:

affixing a capacitance sensor to a stationary element with a means for attaching, wherein the capacitance sensor is arranged between the rotating surface and the stationary element, wherein the rotating surface is a surface of a slip ring;

verifying a system accuracy prior to capturing the air gap measurement;

capturing an air gap measurement between the rotating surface and the stationary element with the capacitance sensor;

increasing the air gap measurement by an amount equal to an offset, wherein the offset equals a thickness of the capacitance sensor plus a thickness of the means for attaching;

correcting the increased air gap measurement with a piece wise linear created from a calibration curve; and displaying the corrected air gap measurement.

2. A non-contact test method for measuring an air gap between a core of a rotor and a stationary pole, comprising:

affixing a capacitance sensor to a core of a rotor with a means for attaching, wherein the capacitance sensor is arranged between the core and a stationary pole;

verifying a system accuracy prior to capturing the air gap measurement, wherein the verifying the system accuracy includes placing the sensor within a gap of a calibration block;

capturing an air gap measurement between the core and the pole with the capacitance sensor;

increasing the air gap measurement by an amount equal to an offset, wherein the offset equals a thickness of the capacitance sensor plus a thickness of the means for attaching;

correcting the increased air gap measurement with a piece wise linear scale created from a calibration curve; and displaying the corrected air gap measurement.

3. A non-contact test method for measuring an air gap between a core of a rotor and a stationary pole, comprising:

affixing a capacitance sensor to a core of a rotor with a means for attaching, wherein the capacitance sensor is arranged between the core and a stationary pole;

verifying a system accuracy prior to capturing the air gap measurement;

capturing an air a measurement between the core and the pole with the capacitance sensor;

increasing the air gap measurement by an amount equal to an offset, wherein the offset equals a thickness of the capacitance sensor plus a thickness of the means for attaching;

correcting the increased air gap measurement with a piece wise linear scale created from a calibration curve, wherein the piece wise linear scale is created from ten segments; and displaying the corrected air gap measurement.

* * * * *